US007987761B2

(12) United States Patent
Butler et al.

(10) Patent No.: US 7,987,761 B2
(45) Date of Patent: Aug. 2, 2011

(54) TIME LIMITED RESTRAINT

(76) Inventors: Frank Butler, Pensacola, FL (US); William G. Rusher, Jr., N. Charleston, SC (US); Philip J. Ufkes, Mt. Pleasant, SC (US)

( * ) Notice: Subject to any disclaimer, the term of this patent is extended or adjusted under 35 U.S.C. 154(b) by 184 days.

(21) Appl. No.: 12/391,325

(22) Filed: Feb. 24, 2009

(65) Prior Publication Data

US 2009/0211316 A1 Aug. 27, 2009

Related U.S. Application Data

(60) Provisional application No. 61/031,477, filed on Feb. 26, 2008, provisional application No. 61/077,305, filed on Jul. 1, 2008, provisional application No. 61/111,017, filed on Nov. 4, 2008.

(51) Int. Cl.
*B64D 1/04* (2006.01)

(52) U.S. Cl. ............................ 89/1.14; 24/16 PB; 70/16

(58) Field of Classification Search .................. 119/859; 70/16; 89/1.14

See application file for complete search history.

(56) References Cited

U.S. PATENT DOCUMENTS

| | | | | |
|---|---|---|---|---|
| 266,205 | A | 10/1882 | Roth et al. | |
| 2,689,697 | A | 6/1953 | Stanley | |
| 3,640,169 | A | 2/1972 | Rosenthal | |
| 3,991,649 | A | 11/1976 | Patrichi | |
| 4,062,112 | A | 12/1977 | Lake | |
| 4,148,257 | A * | 4/1979 | Orrill et al. | 89/1.14 |
| 4,762,088 | A | 8/1988 | Chapman et al. | |
| 4,910,831 | A * | 3/1990 | Bingold | 24/16 PB |
| 5,103,771 | A * | 4/1992 | Lee | 119/776 |
| 5,193,254 | A * | 3/1993 | Geisinger | 24/484 |
| 5,377,510 | A * | 1/1995 | Smith | 70/16 |
| 5,398,383 | A * | 3/1995 | Bingold | 24/16 PB |
| D366,129 | S * | 1/1996 | Escoe, III | D29/120.2 |
| 5,703,315 | A * | 12/1997 | Coggan | 89/1.14 |
| 6,000,249 | A * | 12/1999 | Wilber | 70/16 |
| 6,196,033 | B1 * | 3/2001 | Dowdle | 70/16 |
| 6,374,779 | B1 * | 4/2002 | Miller | 119/863 |
| 6,446,474 | B1 * | 9/2002 | Tabacchi et al. | 70/16 |
| 6,591,731 | B2 | 7/2003 | Goldstein | |
| 6,901,836 | B1 * | 6/2005 | Valembois et al. | 89/1.14 |
| 7,284,399 | B1 * | 10/2007 | Sisco | 70/16 |
| 7,640,639 | B2 * | 1/2010 | de Bien | 24/615 |
| 7,708,314 | B2 * | 5/2010 | Chiappa | 280/801.1 |
| 2004/0016085 | A1 * | 1/2004 | Caveney | 24/16 PB |
| 2004/0154139 | A1 * | 8/2004 | Crook | 24/16 PB |
| 2005/0005878 | A1 * | 1/2005 | Zents et al. | 119/859 |
| 2005/0049630 | A1 * | 3/2005 | Ambach | 606/203 |
| 2009/0165430 | A1 * | 7/2009 | Ferworn et al. | 54/37.1 |
| 2009/0173198 | A1 * | 7/2009 | Chiappa | 83/175 |
| 2009/0255484 | A1 * | 10/2009 | Muelken | 119/792 |

* cited by examiner

*Primary Examiner* — Troy Chambers
*Assistant Examiner* — Samir Abdosh
(74) *Attorney, Agent, or Firm* — B. Craig Killough

(57) ABSTRACT

A time limited restraint device. After a predetermined time, a cutter of the time limited restraint device cuts a restraint.

28 Claims, 5 Drawing Sheets

TIME LIMITED RESTRAINT

Applicants claim the benefit of provisional application Ser. No. 61/031,447 filed Feb. 26, 2008, and provisional application Ser. No. 61/077,305 filed Jul. 1, 2008 and provisional application Ser. No. 61/111,017 filed Nov. 4, 2008.

BACKGROUND OF THE INVENTION

Combatants, such as Special Operations units, are called upon to conduct operations in hostile areas with little or no support immediately available. In these circumstances, the survival of the team often depends primarily on remaining undetected. A problem is the chance encounter with an individual who is, or appears to be, a non-combatant. If the individual is taken into custody, the unit leader faces a difficult choice. If released, the individual would likely reveal the presence of the combatants. The typical result from this sequence of events is an engagement in which the unit may be overwhelmed by a superior force. The captive could be killed to prevent this scenario, but this choice is not acceptable to forces of most civilized countries. Another alternative is to tie the captive up and leave him or her in a concealed location. This avoids the act of killing the prisoner, but might result in his or her death if not discovered within a reasonable time. Taking the prisoner with the patrol presents the patrol with a great risk of compromise should the prisoner run, or make noise that compromises the presence of the unit.

All of these choices are undesirable. Another option is needed. The restraint device described herein provides a viable option. As told in the book Bravo Two Zero by Andy McNab, a Special Air Service (SAS) unit on a SCUD missile hunt in Iraq during Desert Storm was compromised in the manner described above. The individual involved in the chance encounter was released and the patrol was subsequently attacked and taken prisoner by Iraqi forces. A U.S. Special Operations had a similar encounter in the same conflict. They made the same choice and the mission was compromised. The details have not been published, but the unit was reported to have evaded capture or casualties. This scenario occurred again recently, this time with disastrous results. As described in press accounts and the book "Lone Survivor" by Marcus Luttrell, four SEALs from SEAL Team Ten were on a surveillance mission in Taliban-controlled Kunar province in Afghanistan. The unit had a chance encounter with 3 local persons, took them into custody, and was again confronted with a difficult decision. The unit made the humanitarian choice and released the prisoners. Shortly thereafter, the patrol was assaulted by an overwhelming force of Taliban fighters. Three of the four unit members were killed. A helicopter carrying the Quick Reaction Force sent to assist was hit by a rocket-propelled grenade, causing it to crash, and resulting in 11 more Special Operations deaths. This incident was the greatest single-day loss of life in the history of the Navy SEALs.

SUMMARY OF THE INVENTION

A restraint device having a timer actuated release. After a predetermined time, a cutter severs an elongated restraint member to release the restraint.

DETAILED DESCRIPTION OF THE PREFERRED EMBODIMENT

Figure 1:
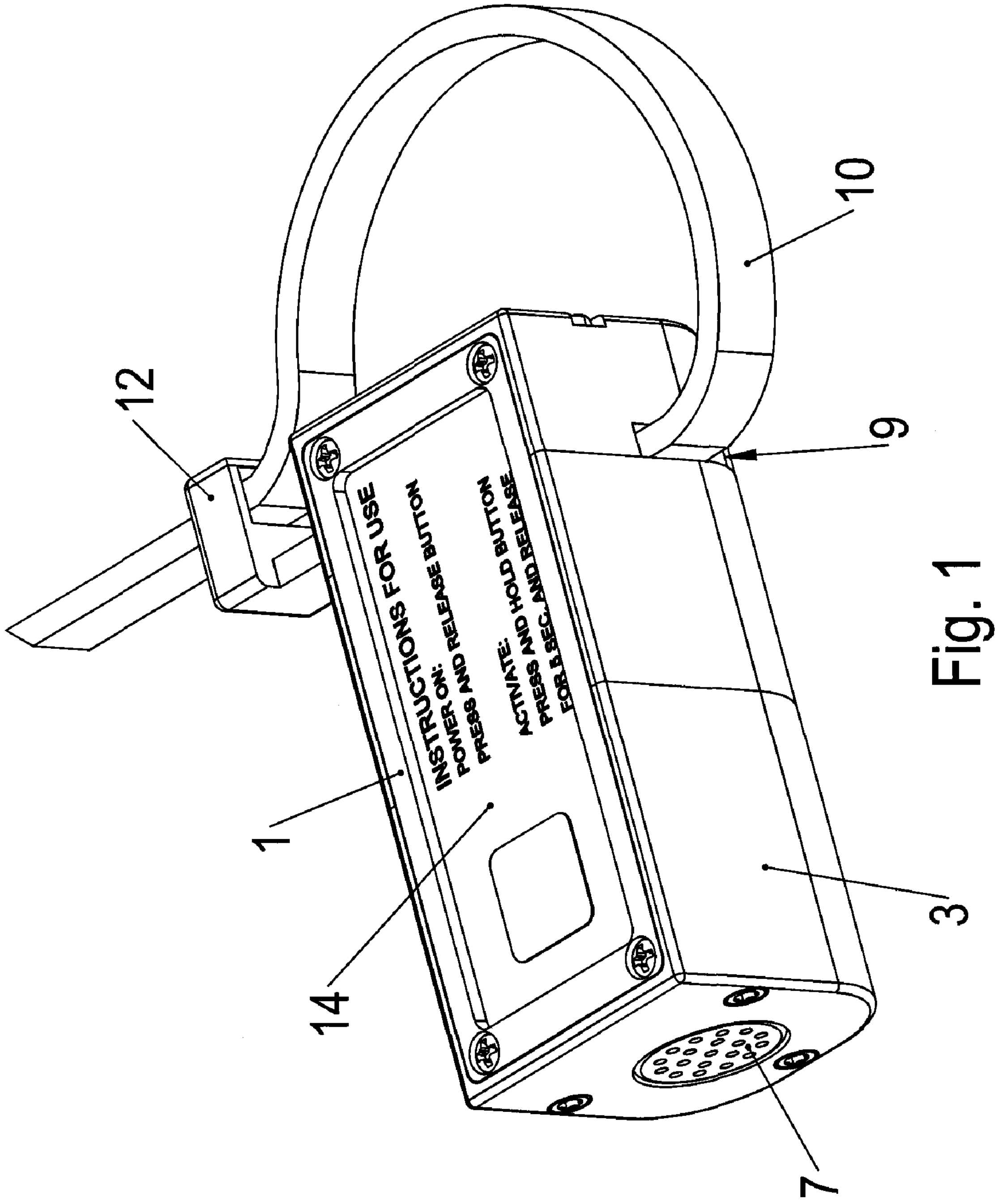
FIG. 1 is a perspective view of an embodiment of the restraint device.

FIG. 1 shows a housing 3 of an embodiment of the restraint device. A restraint 10 is inserted through a receiving opening that forms a restraint guide 9 in an end of the housing. The restraint 10 may be a ratcheting type restraint. One end of the restraint of a preferred embodiment passes through an opening in the restraint, and the end may be easily pulled to tighten the restraint. However, the ratcheting mechanism or attachment member 12 makes it very difficult to pull the restraint in the opposite direction. The restraint is an elongated member that is sufficiently flexible to pull through the receiving opinion in the restraint guide 9 and sufficiently flexible to wrap around both wrists and/or both ankles of a person to be restrained.

Figure 2:
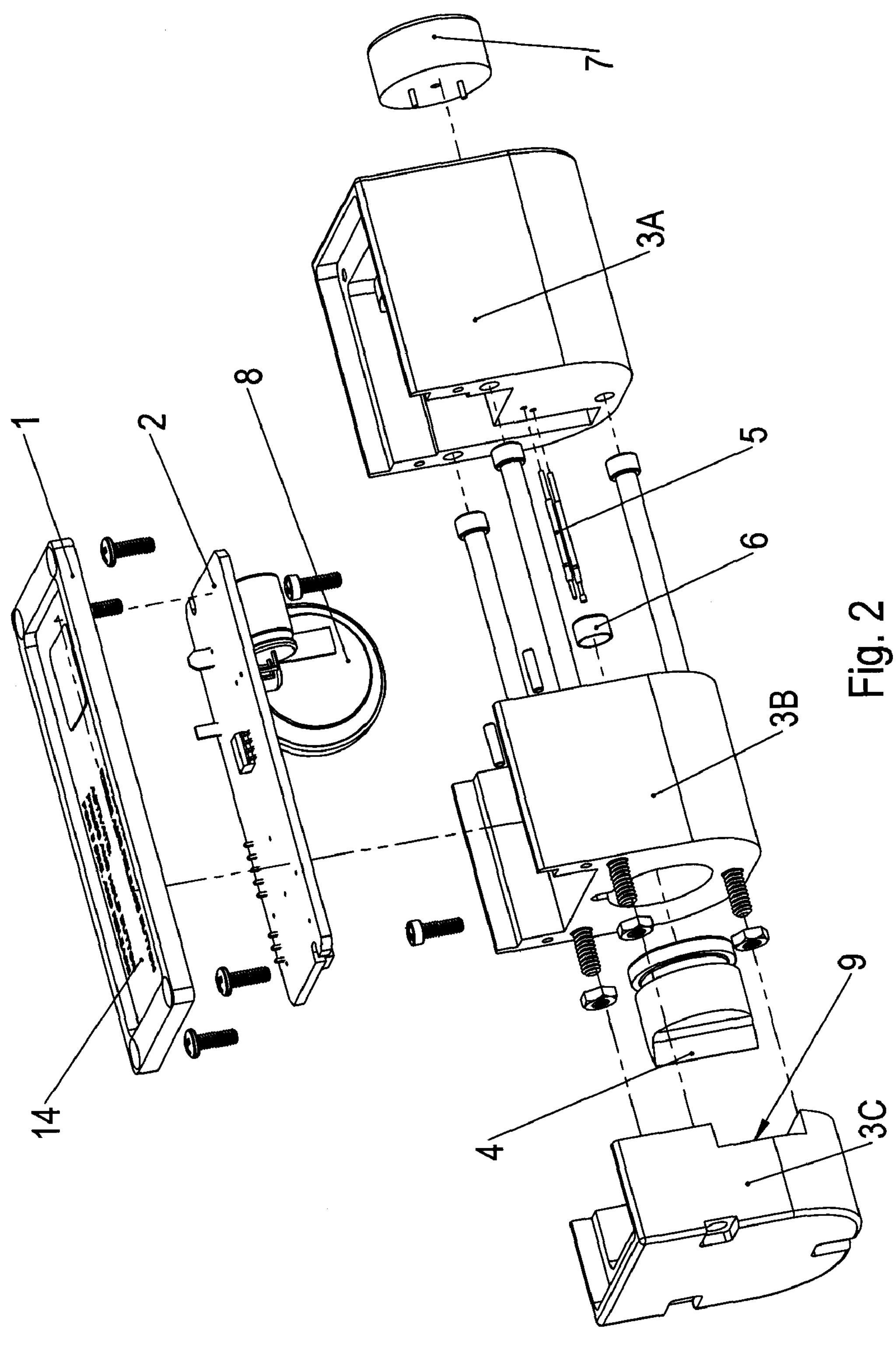
FIG. 2 is an exploded view of an embodiment of the restraint device.

Components of an embodiment of the device are demonstrated in FIG. 2. The housing 3 may be formed in three (3) parts, which are designated in FIG. 2 as 3A, 3B and 3C. An interface panel 1 covers a central processing unit (CPU) 2 that controls the mechanical elements of the device in this embodiment. Other elements of the device in this embodiment are a projectile cutter 4, a primer cap 6, and connection pins 5. Speaker 7 is also provided.

The CPU or microcontroller 2 has a timing circuit. The timing circuit may communicate with a primer charge amplifier 20 that communicates with the electrically actuated primer cap 6 through the connection pins, as shown in this embodiment.

It is preferred that the device has a selectable delay time, so that the user can choose the length of time that the person will be restrained prior to the projectile cutter 4 cutting the restraint 10. In another embodiment, the delay time is fixed. According to one embodiment, a membrane switch overlay 14 on the inner face panel 1 is used to actuate the device. It is preferred that the device has multiple steps for actuation, so that the device is not inadvertently actuated.

In a preferred embodiment, the CPU or microprocessor comprises a circuit that provides audible voice alerts. The audible voice alerts may be provided in multiple languages, and stored on the flash random access memory (RAM) 26. The CPU 2 communicates with speaker 7 to provide the voice alerts. The CPU also provides a battery life monitor with a fail safe test circuit for testing functions of the device prior to use.

By way of example, to power on the device, the membrane switch is pressed and released, and then pressed again and held for a minimum period of time, such as five (5) to fifteen (15) seconds. After the device is powered on, a numeric display may be presented which allows the user to select the time delay before the projectile cutter cuts the restraint, or in other words, the amount of time that the person will be restrained by the restraint. An interactive control communicates with the CPU and allows the user to select the time by increasing or decreasing the time according to the numerical display. In a preferred embodiment, after the delay time is selected, an additional step is required to activate the device. Activation of the device may be achieved by pressing and holding the membrane switch for a period of time, such as five (5) to fifteen (15) seconds after the delayed time is set. In another embodiment, no additional step is required to activate the device.

After the device is activated, in one embodiment, the device audibly informs the person being restrained in his or her language that the device will activate and cut the restraint after a period of time has elapsed. In one embodiment, the device will periodically announce to the person being restrained that the device will release after a predetermined time, or a remaining time before release.

Once the device is activated, the timer and the CPU circuit counts to the predetermined delay time. The predetermined delay time will typically be one (1) to twelve (12) hours, but could be a greater period, such as up to twenty four (24) hours. The time should be sufficient to allow the user to travel a substantial distance from the person being restrained.

After the predetermined time has elapsed, the timer circuit causes the primer cap to fire. The primer cap may contain an ignitable material or powder. The primer cap is an electrically actuated primer cap such as, but not limited to, a Remington® XEL22610 ETRONX™ electric primer. The primer cap 6 of this embodiment has an electrically actuated explosive charge. The explosive charge forces the projectile cutter to move within the cylinder 16 of the housing 3B, away from the primer cap, and advances the blade of the cutter against and through the hand restraint to cut the hand restraint. The hand restraint may then be removed from the housing and from the person who was restrained by the device.

In a preferred embodiment, the cutter 4 is formed as a piston on a surface which is proximal to the primer cap, and is formed as having a sharp blade on a blade end that is distal to the primer cap. The blade end of the cutter strikes the portion of the restraint that is threaded into the restraint guide in housing in 3C. The blade of the projectile cutter is forced against the restraint by the primer cap, and the blade cuts the restraint. The person being restrained may now remove the severed restraint.

A voice alert may be periodically given to the person being restrained, and particularly just prior to the actuation of the primer cap, so that the person is not alarmed when the device fires. The CPU may also cause an audible message to explain to the person being restrained how to remove the restraint.

Figure 3:
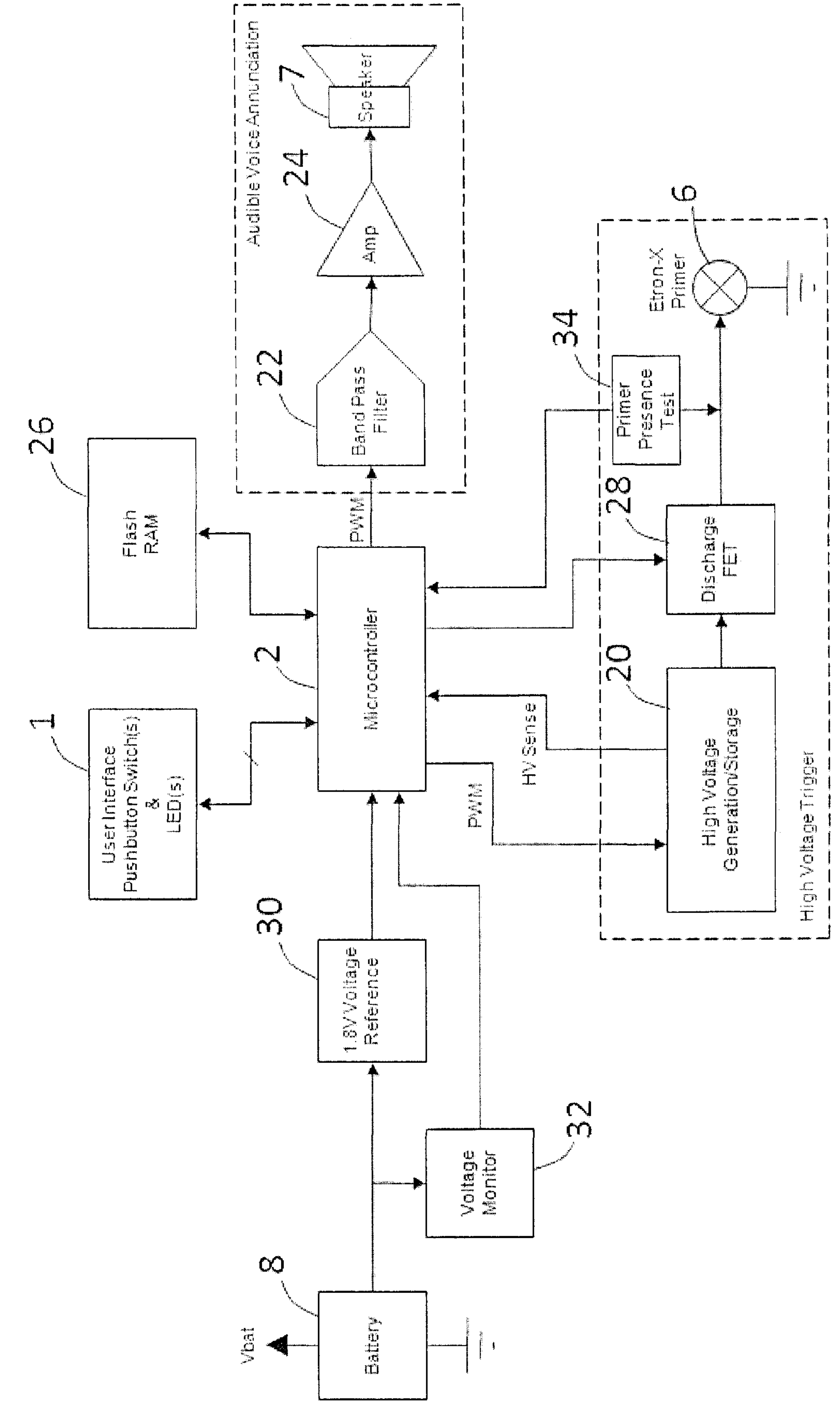
FIG. 3 is a schematic diagram of an embodiment of a perspective view of an embodiment of the restraint device.
Figure 4:
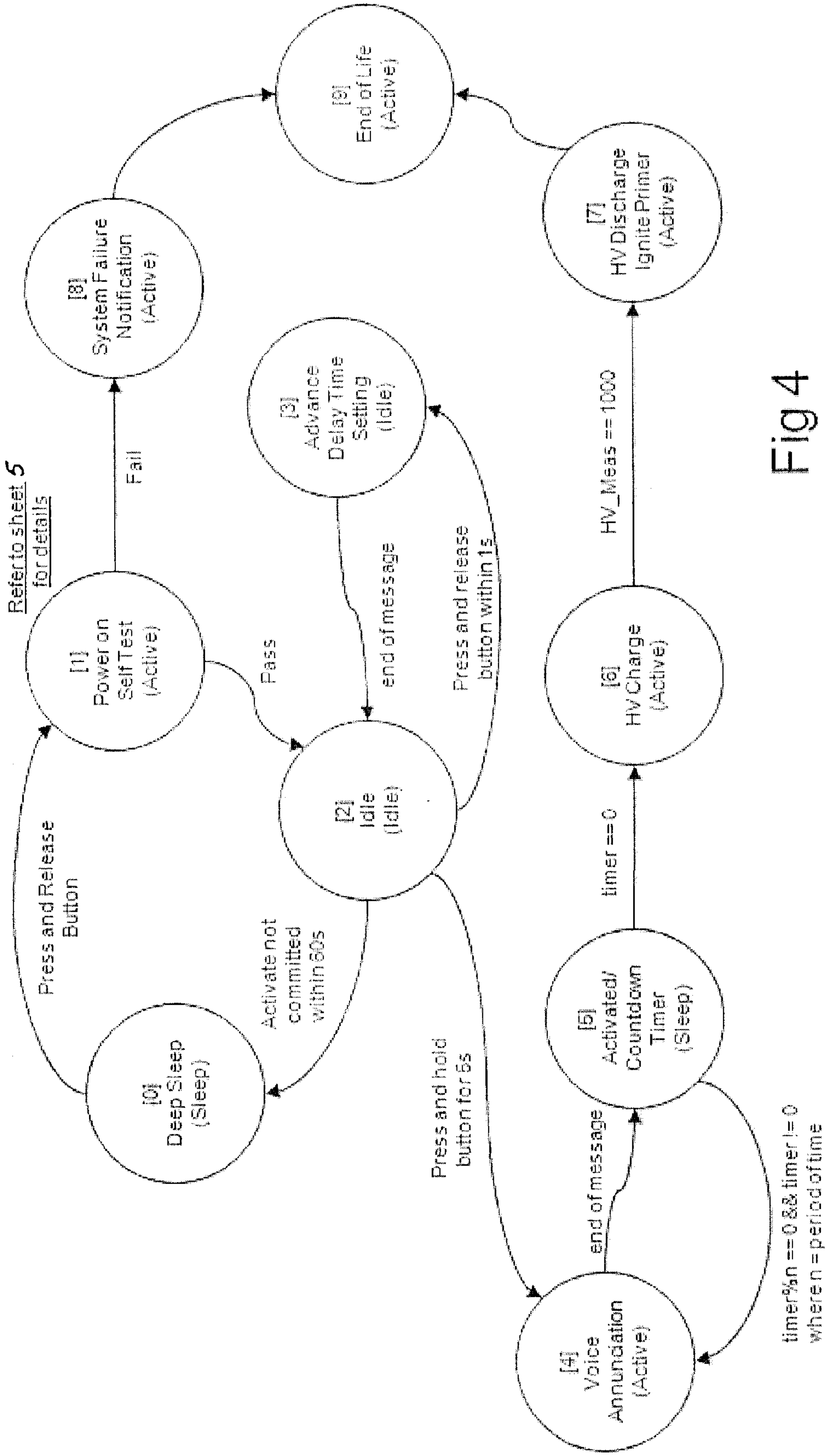
FIG. 4 is a flow diagram showing an exemplary use cycle of an embodiment of the restraint device.

As shown in FIG. 3, a CPU or microcontroller 2 controls the actuation of the device. Upon actuation, the microcontroller causes audible information to be given by speaker 7, which is actuated by band pass filter 22 and amplifier 24. Visual signals, such as go/no-go light indicators may be given to the user.

The electrical functions of the device, including actuation of the primer cap, the CPU, and the timing circuit and voice circuits of the CPU, as well as the test circuits may be powered by a long life battery 8, which may be similar to a watch battery. A voltage reference 30 may be provided. A voltage monitor 32 may be provided that provides information to the microprocessor regarding the battery performance and condition. The battery may, for example, supply 1.8 volts to the microcontroller.

Electrical current to actuate the primer cap may be transmitted from the battery, to the high voltage generator and storage device 20, to the discharge field-effect transistor (FET) 28, through the connection pins to the primer cap, as controlled by the timing circuit of the CPU.

Figure 5:
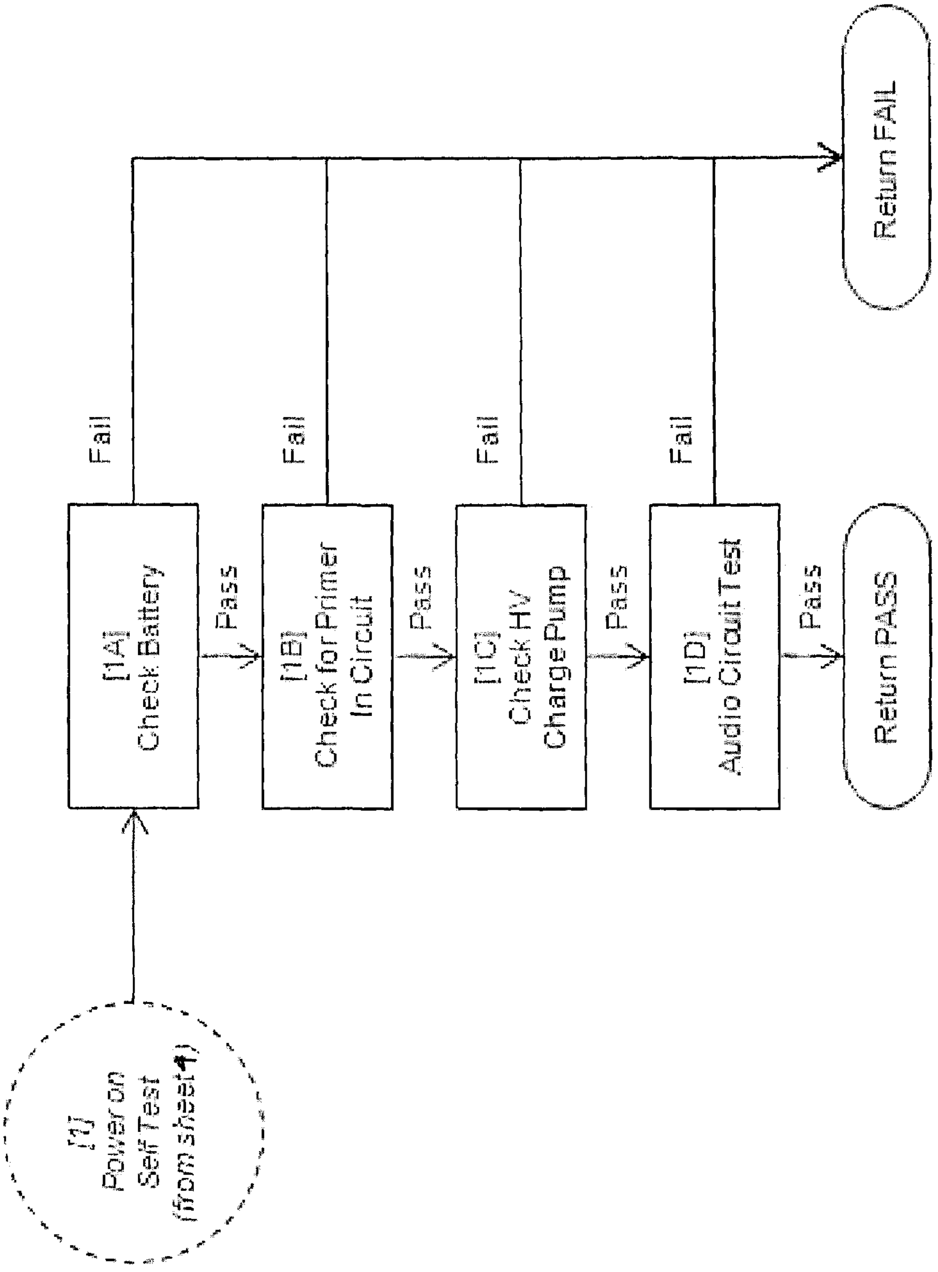
FIG. 5 demonstrates a power on self-test flow diagram for the restraint device.

The device is preferred to have a circuit, provided by the CPU or microprocessor, that will test the device prior to use to verify that the device is working appropriately at the time that the restraint is placed upon a person, and that the device will continue to work for a sufficient period to cut restraint at the predetermined time. FIG. 5. Once the device is powered on as described above, the microprocessor may check the battery to ensure adequate battery life to perform the required functions, and check that the high voltage (HV) charge amplifier 20 is working, and test that the audio circuit is operating correctly. A primer presence test circuit 34 is also provide, to verify the presence of the primer and that the primer has not previously been discharged, and that the circuit may be completed for actuation of the primer cap at the predetermined time. If the device is functioning, either an audible or visual signal will be given, such as an audible message through the voice system, or a "go/no-go", light. Conversely, if the device is not functioning correctly, either an audible or visual message, or both, will be given in a similar manner to the test message.

Operation of one embodiment is described. The elongated restraint is routed though the receiving opening of the restraint guide. The restraint is formed as an annular member, but the opening in the annular member is large, with an end of the restraint placed only slightly through the attachment member. The person to be restrained wrists or ankles are placed into the restraint. The restraint is then pulled tight against the wrists or ankles.

The actuator switch, which may be a membrane, is manually pressed. An test of the device is conducted by the CPU. An indicator, such as a green light, flashes when the test is successfully completed. A red light may mean that the device is defective, damaged, or has previously been fired and not reloaded. The actuator switch is pressed and held if the device is in condition for use.

In one embodiment, the time of restraint is variable according to operator selection. The actuator switch may be sequentially depressed, with possible settings at, for example, one hour, two hours, three hours or four hours. Visual and/or audio confirmation of the time settings is provided.

In another embodiment, an audio message, which may be presented in one or more languages, explains that the device will release after a period of time. In another embodiment, the language or languages for the audio messages may be selected by the user from a menu.

After initiation, the timer of the CPU begins. The audio message confirms the remaining time at predetermined intervals, such as every half hour. After sufficient time has passed, the CPU causes a current to be sent to a high voltage generator. The high voltage may be sent to a discharge FET, which causes the primer to discharge in the cylinder, forcing the cutter against the restraint, with the blade of the cutter severing the restraint.

The restraint 10 may be similar to a cable tie, or restraint members sold as FLEX-CUFS® by NIK® Public Safety, Inc. An elongated and flexible restraint member is formed as an annular member of a desired circumference by sliding an end of said restraint member through an attachment member of said restraint member in a first direction, whereupon the direction of sliding of said first end relative to the attachment member may not be reversed manually. As an attachment member 12 grasps the restraint member and holds the restraint member in position upon attempting reversal of a direction of sliding of the restraint member. Therefore, when the restraint is wrapped around both wrists and/or both ankles of a person to be restrained, it is difficult for the person to remove the restraint.

The restraint in a preferred embodiment may be removed by cutting the restraint, such as with a utility knife or wire cutters. The restraint may be formed of materials which are difficult to chew through, and may be formed to a desired thickness. The restraint may have wire, or plurality of strands of metal, that retard easy cutting or chewing through the restraint.

Some restraints have a first elongated member and a second elongated member formed as a single unit, with the attachment member generally in the center and formed to receive both of the elongated members. These devices allow one wrist or ankle to be placed in the first elongated member and the remaining wrist or ankle to be placed the second elongated member. The invention may be used with these devices, since is only necessary to cut one of the elongated members for the restrained person to have use of their hands or feet.

In another embodiment, a solenoid replaces the primer cap 6. A cutter 4 communicates with, and is actuated by, a plunger on the solenoid. The solenoid receives current at the appointed time, as controlled by the microcontroller 2, in a manner similar to the timing of the current supplied to the primer cap as described above. The actuated solenoid forces the plunger and cutter 4 toward the restraint 10 and through the restraint to cut the restraint. In another embodiment, a linear actuator is used in place of the primer cap in similar manner.

In another embodiment, an electric motor replaces the primer cap 6. A cutter 4 is actuated moved by the electric motor. The motor receives current at the appointed time, as controlled by the microcontroller 2, in a manner similar to the timing of the current supplied to the primer cap as described above. The actuated motor advances cutter 4 toward the restraint 10 and through the restraint to cut the restraint. A gear train is used so that the cutter is supplied with sufficient torque via the motor to cut the restraint, and the electric motor is actuated by the microcontroller for a sufficient time to cut the restraint.

The restraint device is preferred to be less than one hundred grams (100 g) in weight so that it is easily carried. No dimension of the housing of the device exceeds one hundred millimeters (100 mm) in a preferred embodiment. The device may be used in altitudes in excess of forty thousand feet (40,000').

What is claimed is:

1. A time limited restraint device for restraining a person, comprising:

an elongated and flexible restraint member that is constructed and arranged as an annular member of a desired circumference to restrain a person by sliding an end of said elongated and flexible restraint member through an attachment member of said elongated and flexible restraint member in a first direction, whereupon reversal of the direction of sliding of said first end relative to the attachment member is inhibited as said attachment member grasps said elongated and flexible restraint member and holds the elongated and flexible restraint member in position upon attempted reversal of direction of sliding of said elongated and flexible restraint member from said first direction, and wherein, when the elongated and flexible restraint member is formed as an annular member, the elongated and flexible restraint member is constructed and arranged to retain a wrist or ankle of a restrained person, a cutter that is positioned in proximity to the elongated and flexible restraint member when the elongated and flexible restraint member is positioned to retain the wrist or ankle of the restrained person, wherein the restraint member is threaded through the cutter a timer, and an actuator that forces said cutter against said elongated and flexible restraint member upon receiving a signal from said timer, whereupon said cutter severs said elongated and flexible restraint member.

2. A time limited restraint device for restraining a person as described in claim 1, wherein a portion of the elongated and flexible restraint member is present in a housing, and wherein said cutter is present in the housing and is positioned in proximity to the portion of the elongated and flexible restraint member that is present in the housing, and wherein said cutter that is present in the housing forces said cutter against said elongated and flexible restraint member upon receiving a signal from said timer, and wherein the housing is constructed and arranged to be positioned adjacent to the restrained person.

3. A time limited restraint device for restraining a person as described in claim 1, wherein said attachment member is a ratchet, and wherein said elongated and flexible restraint member has a plurality of teeth disposed along its length, and wherein said ratchet engages said teeth so as to permit said restraint elongated and flexible member to be advanced relative to said attachment member in a first direction, but said ratchet prevents reversal of direction of said elongated and flexible restraint member.

4. A time limited restraint device for restraining a person as described in claim 1, wherein said actuator comprises an explosive charge that explodes against said cutter and advances said cutter against said elongated and flexible restraint member upon said actuator receiving a signal from said timer, whereupon said cutter severs said elongated and flexible restraint member.

5. A time limited restraint device for restraining a person as described in claim 1, wherein said actuator comprises an explosive charge that explodes against said cutter and advances said cutter against said elongated and flexible restraint member upon said actuator receiving a signal from said timer, whereupon said a blade of said cutter severs said elongated and flexible restraint member.

6. A time limited restraint device for restraining a person as described in claim 1, wherein said actuator comprises an electrically actuated primer cap, whereupon said electrically actuated primer cap actuator receiving a signal from said timer, said primer cap is actuated to advance said cutter against said elongated and flexible restraint member, whereupon said cutter severs said elongated and flexible restraint member.

7. A time limited restraint device for restraining a person as described in claim 1, further comprising a microprocessor, wherein said microprocessor comprises said timer.

8. A time limited restraint device for restraining a person as described in claim 1, further comprising a microprocessor, wherein said microprocessor comprises said timer and said microprocessor further comprises a circuit that creates an audible message.

9. A time limited restraint device for restraining a person as described in claim 1, further comprising a microprocessor, wherein said microprocessor comprises said timer and said microprocessor further comprises a circuit that creates an audible message in a plurality of languages.

10. A time limited restraint device for restraining a person as described in claim 1, further comprising a housing having a cylinder formed therein and a guide opening formed therein, wherein said cutter is slidably disposed in a said cylinder, and said cutter is formed as a crown of a piston on an end of said cutter, and said elongated and flexible restraint member engages said guide opening formed in said housing, and wherein a cutting end of said cutter is forced into guide opening by said actuator applying a force to said piston of said cutter upon receiving a signal from said timer, and said cutting end of said cutter severs said elongated and flexible restraint member.

11. A time limited restraint device for restraining a person as described in claim 1, whereupon an interval of time between initiation of the time limited restraint device and said timer generating a signal that is received by said actuator is selectively variable.

12. A time limited restraint device for restraining a person as described in claim 1, wherein said actuator is an electrically actuated primer cap.

13. A time limited restraint device for restraining a person, comprising:

an elongated and flexible restraint member that is formed as an annular member and said annular member is constructed and arranged to receive and retain a wrist or ankle of a restrained person therein, a slidable cutter comprising a blade on an end thereof, wherein said blade is positioned proximally to said elongated and flexible restraint member when said annular member is constructed and arranged to receive and retain a wrist or ankle of a restrained person therein, wherein the restraint member is threaded through the cutter a timer, and an electrically actuated explosive charge that, upon receiving an electrical signal initiated by said timer, explodes said explosive charge and advances said slidable cutter to slide against and through said elongated and flexible restraint member upon receiving a signal from said timer, whereupon said blade of said cutter severs said elongated and flexible restraint member as said cutter slides against and through said elongated and flexible restraint member.

14. A time limited restraint device for restraining a person as described in claim 13, further comprising a housing, wherein a portion of the elongated and flexible restraint member is present in the housing, wherein said slidable cutter is contained in the housing and is positioned in proximity to the portion of the elongated and flexible restraint member that is present in the housing, and said slidable cutter is forced against the portion of the elongated and flexible restraint member is present in the housing by said electrically actuated explosive charge upon receiving said signal initiated by said timer, and said blade of said cutter severs said elongated and flexible restraint member, and wherein the housing is constructed and arranged to be positioned adjacent to the restrained person.

15. A time limited restraint device for restraining a person as described in claim 13, wherein said electrically actuated explosive charge is a primer cap.

16. A time limited restraint device for restraining a person as described in claim 13, further comprising a microprocessor, wherein said microprocessor comprises said timer and said microprocessor further comprises a circuit that creates an audible message.

17. A time limited restraint device for restraining a person as described in claim 13, further comprising a microprocessor, wherein said microprocessor comprises said timer and said microprocessor further comprises a circuit that creates an audible message in a plurality of languages.

18. A time limited restraint device for restraining a person as described in claim 13, whereupon an interval of time between initiation of the time limited restraint device and said timer generating a signal that is received by said electrically actuated explosive charge is selectively variable.

19. A time limited restraint device for restraining a person as described in claim 2, wherein said timer is contained in said housing.

20. A time limited restraint device for restraining a person as described in claim 2, wherein said timer is contained in said housing and further comprising a battery that provides power to the timer and the actuator, wherein said battery is contained in said housing.

21. A time limited restraint device for restraining a person as described in claim 1, whereupon an interval of time between initiation of the time limited restraint device and said timer generating a signal that is received by said actuator is selectively variable for an interval of up to twelve (12) hours.

22. A time limited restraint device for restraining a person as described in claim 2, whereupon an interval of time between initiation of the time limited restraint device and said timer generating a signal is displayed on an interface panel of said housing.

23. A time limited restraint device for restraining a person as described in claim 2, whereupon an interval of time between initiation of the time limited restraint device and said timer generating a signal that is received by said actuator is selectively variable for an interval of up to twelve (12) hours and the interval of time is displayed on an interface panel of said housing.

24. A time limited restraint device for restraining a person as described in claim 14, wherein said timer is contained in said housing.

25. A time limited restraint device for restraining a person as described in claim 14, wherein said timer is contained in said housing and further comprising a battery that provides power to the timer and the actuator, wherein said battery is contained in said housing.

26. A time limited restraint device for restraining a person as described in claim 13, whereupon an interval of time between initiation of the time limited restraint device and said timer generating a signal that is received by said actuator is selectively variable for an interval of up to twelve (12) hours.

27. A time limited restraint device for restraining a person as described in claim 14, whereupon an interval of time between initiation of the time limited restraint device and said timer generating a signal is displayed on an interface panel of said housing.

28. A time limited restraint device for restraining a person as described in claim 14, whereupon an interval of time between initiation of the time limited restraint device and said timer generating a signal that is received by said actuator is selectively variable for an interval of up to twelve (12) hours and the interval of time is displayed on an interface panel of said housing.

* * * * *